(12) United States Patent
Sakamoto et al.

(10) Patent No.: US 7,756,422 B2
(45) Date of Patent: Jul. 13, 2010

(54) METHOD FOR MEASURING OPTICAL CHARACTERISTICS AND SYSTEM THEREOF

(75) Inventors: Takeshi Sakamoto, Kawasaki (JP); Kosuke Komaki, Kawasaki (JP); Yuji Shimada, Kawasaki (JP); Takuji Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1006 days.

(21) Appl. No.: 11/502,535

(22) Filed: Aug. 11, 2006

(65) Prior Publication Data

US 2007/0217794 A1 Sep. 20, 2007

(30) Foreign Application Priority Data

Mar. 16, 2006 (JP) .............................. 2006-073538

(51) Int. Cl.
*H04B 10/00* (2006.01)
(52) U.S. Cl. ..................... 398/177; 398/180; 398/181; 398/25; 398/28; 398/30; 398/31; 398/33; 398/34
(58) Field of Classification Search ................... 398/25, 398/26, 28, 30–34, 173, 177, 180, 181
See application file for complete search history.

(56) References Cited

U.S. PATENT DOCUMENTS 5,923,453 A * 7/1999 Yoneyama ................... 398/34

| 6,483,616 | B1 * | 11/2002 | Maddocks et al. ............. 398/1 |
| 6,504,630 | B1 * | 1/2003 | Czarnocha et al. ............ 398/15 |
| 6,559,985 | B1 * | 5/2003 | DeGrange, Jr. et al. ......... 398/5 |
| 6,819,875 | B2 * | 11/2004 | Touma ........................ 398/177 |
| 2003/0081295 | A1 * | 5/2003 | Kamura ....................... 359/174 |
| 2004/0091263 | A1 * | 5/2004 | Sakamoto ..................... 398/45 |
| 2004/0146306 | A1 * | 7/2004 | Muzicant et al. ............. 398/177 |
| 2005/0158057 | A1 * | 7/2005 | Tomofuji et al. ............. 398/160 |

FOREIGN PATENT DOCUMENTS

| JP | 06-097554 | 4/1994 |
| JP | 9-116504 | 5/1997 |

* cited by examiner

*Primary Examiner*—Ken N Vanderpuye
*Assistant Examiner*—Li Liu
(74) *Attorney, Agent, or Firm*—Staas & Halsey LLP (57) ABSTRACT

During initial start-up of an optical communication system, an ASE reference span loss is calculated based on transmitting power and received power of ASE light generated by an optical amplifier, and an OSC reference span loss is calculated based on the transmitting power and the received power of OSC light. During normal operation of the optical communication system, a span loss is calculated using the OSC light, and an amount of change in the span loss representing a difference between the span loss and the OSC reference span loss is calculated. A current span loss between a transmitting station and a receiving station is calculated by adding the amount of change in the span loss to the ASE reference span loss.

12 Claims, 10 Drawing Sheets

METHOD FOR MEASURING OPTICAL CHARACTERISTICS AND SYSTEM THEREOF

BACKGROUND OF THE INVENTION

1. Field of the Invention

The present invention relates to a method for measuring optical characteristics and a system thereof in an optical communication system for transmitting WDM (Wavelength Division Multiplexed) light.

2. Description of the Related Art

In recent years, a function for automatically measuring and displaying optical loss (i.e., a span loss) in an optical communication system between terminals, between a terminal and a relay station or between relay stations has been requested in order to improve user operability and in order to automate various settings. This measurement function includes a function that will notify a user of a change in span loss caused by external factions during operation of the communications system. Additionally, during the initial start-up of the communication system or the like, the measurement function is also used for measuring error between a designed value (determined in advance by simulation or similar processes) and actual span loss, or used for confirming whether the input level/output level of an optical transmission system has a predetermined provision.

The span loss between stations is, in principle, determined by providing a photo detector for detecting optical power in the transmitting station and the receiving station respectively and calculating the difference between the optical output level in the transmitting station and an optical input level in the receiving station. Note that the patent document 1 (Japanese Patent Application Laid-Open No. 9-116504) discloses a configuration in an optical communication system provided with two-system optical fiber transmission lines for guiding a part of an optical signal propagating through one of the transmission lines to the other transmission line and measuring the power of the optical signal so as to measure the gain and the loss in the optical fiber transmission system.

In a WDM transmission system, a plurality of optical signals are transmitted using a plurality of different wavelengths. In addition, many span loss standards and optical level of the transmission line standards are specified as characteristics at a central wavelength of a predetermined wavelength band, including the signals (e.g., approximately 1550 nm for C-band). Therefore, it is desirable that the span loss (or the like) of the transmission line may be measured using an optical signal which possesses the central wavelength during the initial start-up of the transmission system or during the operation of the transmission system.

Figure 1:
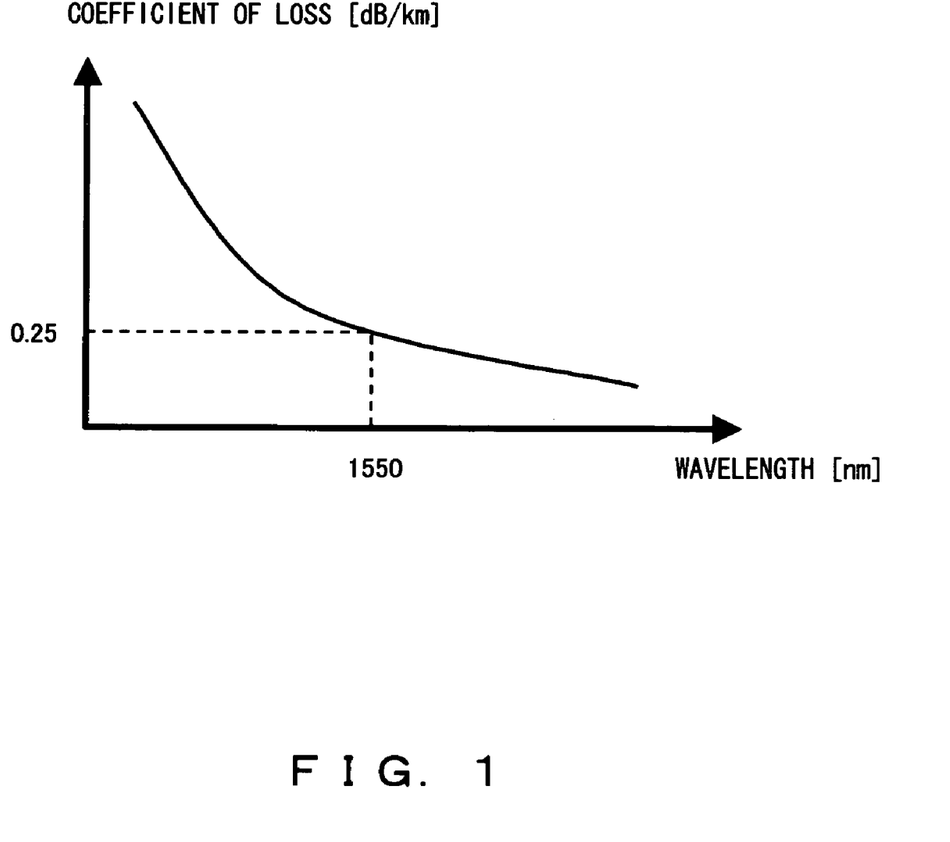
FIG. 1 is a diagram showing a wavelength characteristic of an optical fiber.

However, in practice, there is no determination of which of the plurality of wavelengths that have been prepared in advance is to be used. That is to say, in some cases, the central wavelength that is used in designing the transmission system is not actually used. On the other hand, a loss in the optical fiber has wavelength dependence as shown in FIG. 1. Accordingly, it is difficult for the customer to accurately know the span loss at the central wavelength, which the customer needs to know in the case in which a wavelength that is different from the central wavelength is used. Additionally, during the initial start-up of the system, it may be assumed that no single wavelength within the WDM signal wavelength band will be inputted. In that case, as well, the span loss is not measurable.

One possible solution to this daunting problem is a configuration which uses an OSC (Optical Supervisory Channel) signal. In general, an OSC signal is allocated a wavelength that is out of the signal wavelength band for transmitting the data, and the OSC signal is always transmitted during operation of the transmission system. According to this method, the optical level of the OSC light carrying the OSC signal is measured in the transmitting station and the receiving station to measure the span loss at the OSC wavelength. Next, the span loss at the central wavelength is estimated from the span loss at the OSC wavelength based on the predetermined wavelength characteristics of the optical fiber. According to this method, the span loss at the central wavelength can be estimated without being affected by the number or the allocation of wavelengths that are actually used. However, the information representing the distance between the stations (i.e., the length of the optical fiber) is required in order to estimate the span loss at the central wavelength from the span loss of the OSC light. Therefore, if accurate information about the distance between the stations is not available, the estimated span loss may have significant error.

SUMMARY OF THE INVENTION

An object of the present invention is to provide a method, in a communication system for transmitting a WDM signal, for accurately measuring the characteristics of an optical transmission line without using an optical signal allocated in a signal wavelength band.

The measurement system of the present invention measures a span loss between a transmitting station and a receiving station in an optical communication system for transmitting WDM light in a predetermined signal wavelength band from the transmitting station to the receiving station. The measurement system comprises: a reference light generation unit, provided in the transmitting station, for generating reference light having a wavelength component in the signal wavelength band; a first photo detector, provided in the transmitting station, for detecting the optical power of the signal wavelength band; a second photo detector, provided in the receiving station, for detecting the optical power of the signal wavelength band; a third photo detector, provided in the transmitting station, for detecting the optical power of control light having a wavelength which is allocated out of the signal wavelength band; a fourth photo detector, provided in the receiving station, for detecting the optical power of the control light; a first calculation unit for calculating a reference span loss from results detected by said first and second photo detectors when the reference light is being generated; a second calculation unit for calculating correction data from results detected by said third and fourth photo detectors; and a third calculation unit for calculating a span loss in the signal wavelength band by correcting the reference span loss using the correction data.

In this measurement system, a reference span loss is prepared in advance using the reference light that has a wavelength component within the signal wavelength band. Then, the correction data is calculated using the control light having a wavelength that is allocated out of the signal wavelength band. Finally, the span loss in the signal wavelength is calculated by correcting the reference span loss using the correction data.

In the measurement system as described above, the reference light generation unit may be realized by an optical amplifier for amplifying an optical signal to be transmitted to the receiving station. In this case, an Amplified Spontaneous Emission (ASE) light output from the optical amplifier is used as the reference light.

In WDM system, a span loss value measured using an optical signal having a substantially central wavelength is frequently required. However, in the measurement system of the present invention, the span loss is measured using the ASE light. The transmitting power and the received power of the ASE light in the signal wavelength band correspond to the transmitting power and the received power of the optical signal that has a substantially central wavelength in the signal wavelength band. Accordingly, even without preparing an optical signal having a substantially central wavelength in the signal wavelength band, it is possible to perform a measurement equivalent to the measurement in which an optical signal having such a central wavelength is used. Furthermore, changes in span loss during operation of the system may be measured by the control light. Therefore, irrespective of the presence or absence of an optical signal for transmitting the data (or a wavelength allocation thereof), the latest span loss can be measured. This measurement may be performed, in other words, without affecting the data being operated upon.

The present invention enables providing a method, in a communication system for transmitting a WDM signal, for accurately measuring characteristics of an optical transmission line without using an optical signal allocated in a signal wavelength band.

BRIEF DESCRIPTION OF THE PREFERRED EMBODIMENTS

Figure 2:
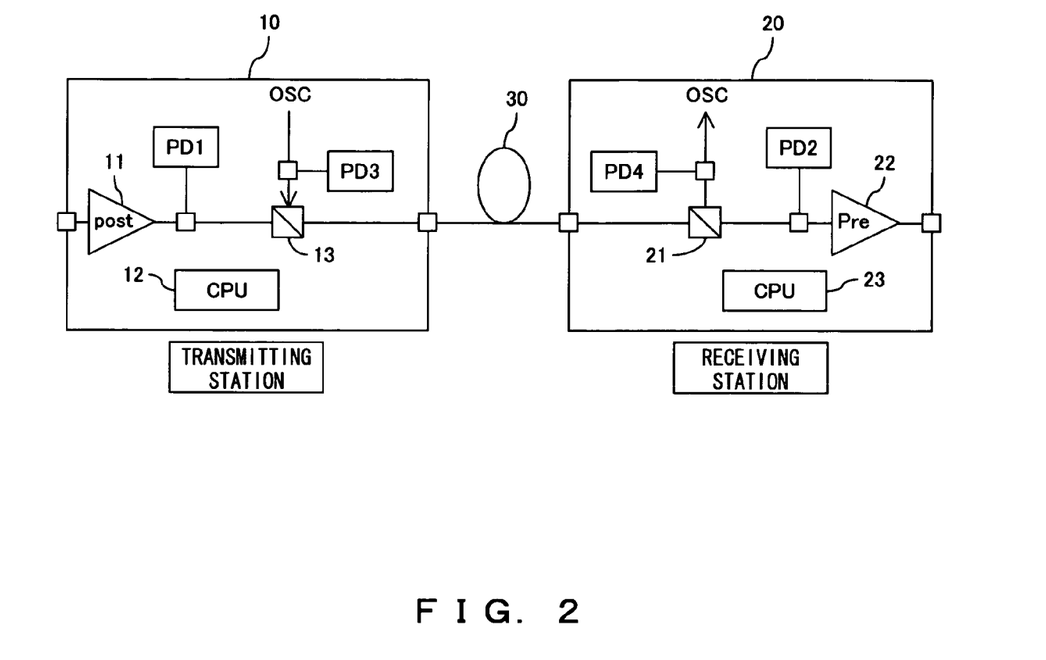
FIG. 2 is a diagram showing a configuration of a transmitting station and a receiving station.

FIG. 2 is a diagram showing a configuration of a transmitting station and a receiving station provided in an optical communication system according to the present invention. It is herein assumed that the optical communication system according to the present invention is a WDM transmission system that transmits a plurality of signals by multiplexing a plurality of wavelengths that are different from each other. The measurement system according to the present invention measures optical characteristics (e.g., as a span loss, a receiving level, etc.) of a transmission line between the transmitting station and the receiving station. Note that, in the case where the characteristics between a transmitting terminal and a relay station are to be measured, the relay station serves as the receiving station. In the case where the characteristics between a relay station and a receiving terminal are to be measured, the relay station serves as the transmitting station. Furthermore, in the case where the characteristics between relay stations are to be measured, the relay station on the upstream side serves as the transmitting station, and the relay station on a downstream side serves as the receiving station.

An optical amplifier (post amplifier) 11 in FIG. 2, for example, is a rare-earth-doped optical fiber amplifier used for amplifying signal light to be transmitted to a receiving station 20 using pump light energy. Examples of an amplification control includes an Automatic Level Control (ALC) which holds a certain output level, or an Automatic Gain Control (AGC) which holds a certain gain, among others. The signal light for transmitting data to the receiving station 20 is allocated with a wavelength that belongs to a predetermined wavelength band. Although the wavelength band is not particularly limited, it is, in this example, a C-band (1530 to 1560 nm). Note that in the description hereinafter, the wavelength band allocated to the signal light may sometimes be referred to as a "signal wavelength band."

Photo detectors PD1 and PD3 are respectively, for example, photo diodes. A photo detector PD1 detects output power of light transmitted to the receiving station 20. In the configuration shown in FIG. 2, however, part of the light output from an optical amplifier 11 is split by an optical splitter and guided to a photo detector PD1. The OSC (Optical Supervisory Channel) light, to be described later, is not guided to the photo detector PD1. Therefore, the photo detector PD1 detects the power of the signal light and noise light (i.e., Amplified Spontaneous Emission (ASE) light generated by the optical amplifier 11). In the case where the signal light is not transmitted (that is, in the case where the number of channels for transmitting an optical signal is zero), the photo detector PD1 detects power of the ASE light.

A photo detector PD3 detects the output power of the OSC light. In the configuration shown in FIG. 2, part of the OSC light is split by an optical splitter and guided to the photo detector PD3. The OSC light (or control light) is allocated with a wavelength that is out of the signal wavelength band, and transmits an OSC signal for notification between the stations of the status of the optical communication system. In the case, for example, where the C-band is used as the signal wavelength band, the wavelength of the OSC light is 1510 nm. Note that the OSC light is generated by a CPU 12, and is multiplexed to the signal light using, for example, a WDM coupler 13. Further note that the outputs from the photo detectors PD1, PD3 are converted to digital data (optical output power data) by an A/D converter, not shown.

The CPU 12 acquires and holds optical output power data detected by the photo detectors PD1 and PD3. Here, the optical output power data detected by the photo detectors PD1 and PD3 is transmitted to the receiving station 20 using the OSC light as necessary. In this case the optical output power data is accommodated in a certain range of a frame for transmitting the OSC signal and transmitted. In addition, the CPU 12 is capable of generating the ASE light in the optical amplifier 11. In the measurement method according to the present embodiment, the CPU 12 make the optical amplifier 12 generate the ASE light in the case in which the signal light is not transmitted during initial start-up of the optical communication system. Note that the CPU 12 also controls other operations of the transmitting station 10.

It is desirable that the transmitting station 10, in advance, holds the information related to an optical loss generated inside the transmitting station 10 (for example, an optical loss generated from the photo detectors PD1, PD3 to the output terminal of the transmitting station 10). In this case, the CPU 12 is capable of converting optical output power values detected by the photo detectors PD1 and PD3 into optical output power values at the output terminal of the transmitting station 10, respectively.

The signal light and the OSC light transmitted from the transmitting station 10 are transmitted to the receiving station 20 via an optical fiber 30. Note that the ASE light, which is generated by the optical amplifier 11, is also transmitted to the receiving station 20 via the optical fiber 30.

The receiving station 20 includes an optical filter 21 for extracting a wavelength component of the signal wavelength band and a wavelength component of the OSC light from the input light, respectively. In other words, the signal light and the OSC light are each respectively extracted from the input light. The signal light is guided to an optical amplifier (preamplifier) 22 and the OSC light is guided to a processing circuit for processing the OSC signal.

Photo detectors PD2 and PD4 are, for example, photo diodes. The photo detector PD4 detects the input power of the OSC light. The photo detector PD2 detects the optical input power of the wavelength component of the signal wavelength band. Hence, when an optical signal in the signal wavelength band is transmitted from the transmitting station 10, the total optical power of the signal light and the ASE light is detected by the photo detector PD2. However, when the optical signal in the signal wavelength band is not transmitted from the transmitting station 10, only the power of the ASE light is detected by the photo detector PD2. Following such detection, the output of the photo detectors PD2 and PD4 are converted into digital data (optical input power data) by an A/D converter (not shown).

A CPU 23 acquires and holds the optical input power data detected by the photo detectors PD2 and PD4. The CPU 23 also decodes the OSC signal transmitted from the transmitting station 10 and acquires the optical output power data detected by the transmitting station 10. Then the CPU 23 calculates a span loss between the transmitting station 10 and the receiving station 20 using the optical output power data and the optical input power data. Note that the CPU 23 also controls other operations of the receiving station 20.

It is desirable that the receiving station 20, in advance, holds the information related to an optical loss generated inside the receiving station 20 (for example, the optical loss generated from the input terminal of the receiving station 20 to the photo detectors PD2 and PD4). In this case, the CPU 23 is capable of converting optical input power values detected by the photo detectors PD2 and PD4 into the optical input power values at an input terminal of the receiving station 20, respectively.

In the optical communication system as configured above, the span loss between the transmitting station 10 and the receiving station 20 is measured according to the following procedure:

1. During the initial start-up of the optical communication system, measure a first reference span loss using the ASE light and measure a second reference span loss using the OSC light.

2. During normal operation of the communication system, measure a span loss using the OSC light and detect the amount of change compared to the second reference span loss.

3. Calculate the latest span loss by adding the amount of change in span loss to the first reference span loss.

As described above, the reference span loss is measured in advance using the ASE light, and the change in optical characteristics of a transmission line during the operation state is detected using the OSC light.

Figure 3:
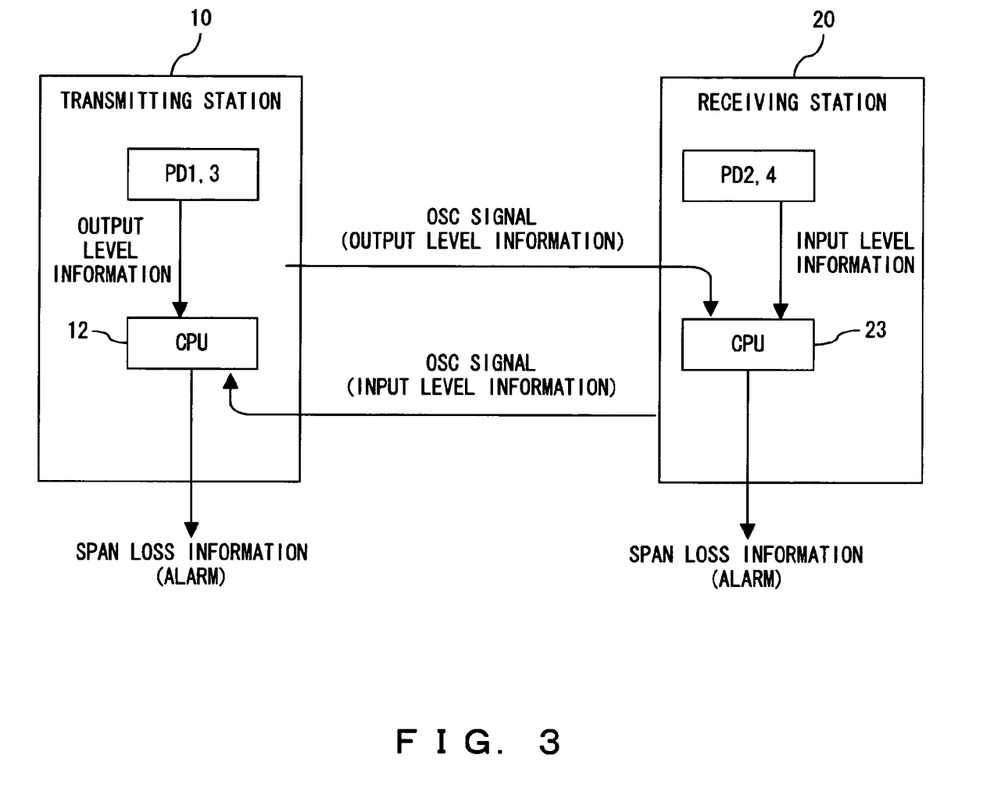
FIG. 3 is a diagram schematically showing a procedure for measuring a span loss.

FIG. 3 is a diagram schematically showing a procedure for measuring the span loss. In the example as described above, the span loss is calculated in the receiving station 20. Specifically, the transmitting station 10 acquires output level information using the photo detectors PD1 and PD3. The output level information is transmitted to the receiving station 20 using the OSC signal. Additionally, the receiving station 20 acquires input level information using the photo detectors PD2 and PD4 and receives the output level information from the transmitting station 10. Then the receiving station 20 calculates the span loss based on the output level information and the input level information.

The span loss may be calculated in the transmitting station 10. Specifically, in the case in which a signal can be transmitted from the receiving station 20 to the transmitting station 10 (e.g., where a bi-directional communication channel is provided between the transmitting station 10 and the receiving station 20), a span loss may also be calculated in the transmitting station 10. In this case, the receiving station 20 transmits the input level information to the transmitting station 10 using the OSC signal. Then the transmitting station 10 calculates the span loss based on the output level information and the input level information.

The calculated span loss information is displayed in a predetermined display unit at the request of a user. In addition, an alarm may be issued in the case where the calculated span loss indicates an abnormal value.

A measurement method according to the present embodiment will be hereinafter described in detail:

<<Measurement of a Span Loss (a Basic Method)>>

Figure 4A:
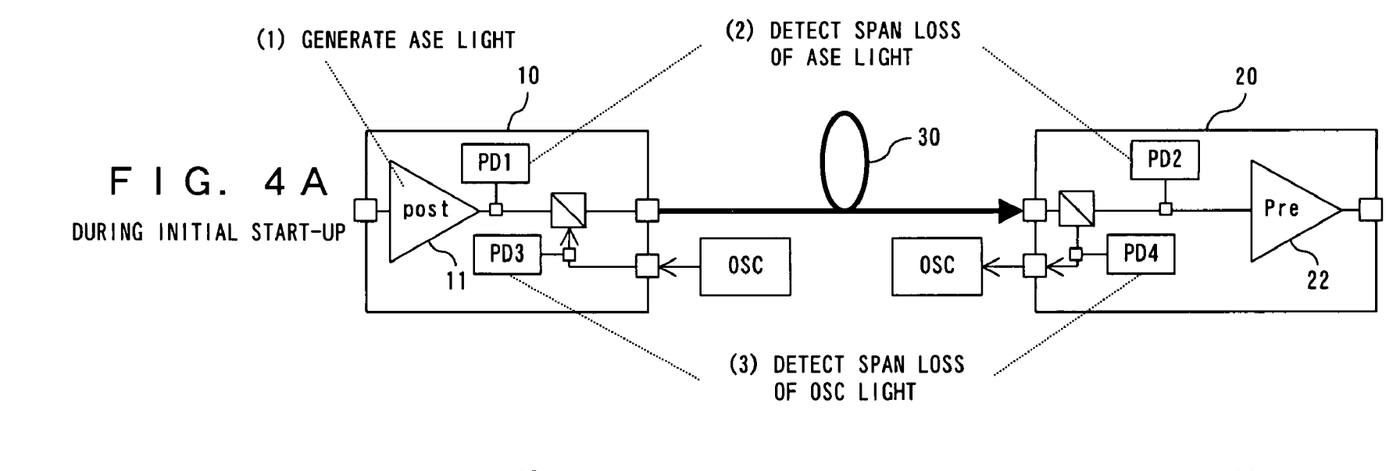
FIGS. 4A and 4B are diagrams showing a method for measuring a span loss between the transmitting station and the receiving station.
Figure 4B:
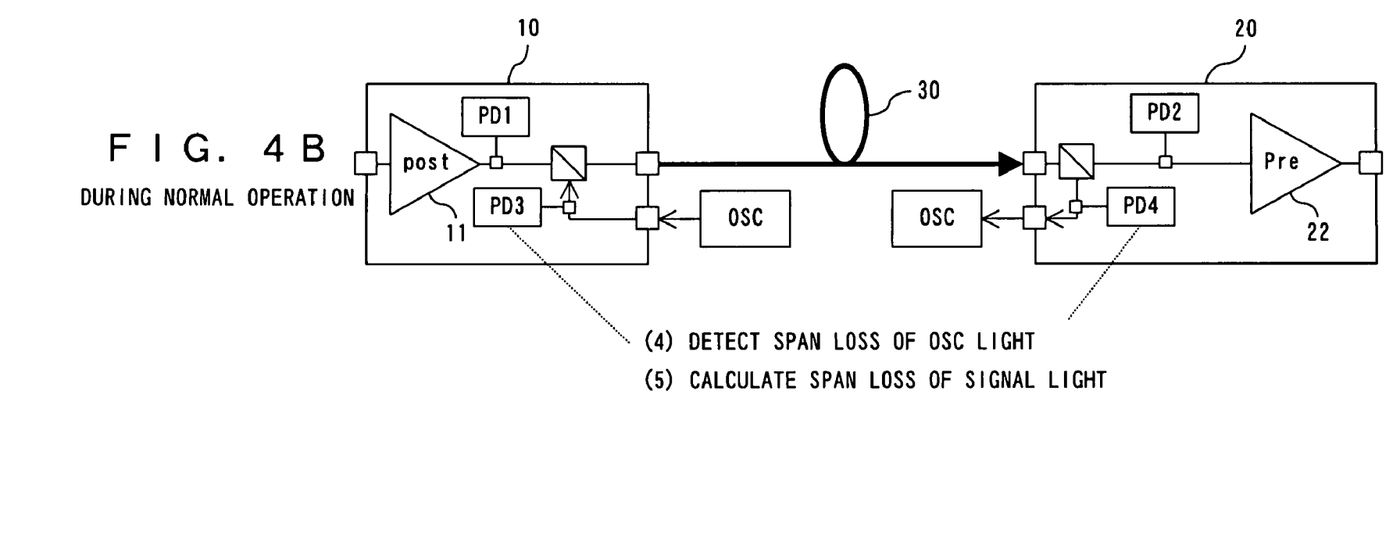

FIGS. 4A and 4B are diagrams showing a method for measuring a span loss between the transmitting station 10 and the receiving station 20. FIG. 4A shows a procedure to be performed during initial start-up of an optical communication system, and FIG. 4B shows a procedure to be performed constantly or periodically during the optical communication system is in an operation state.

<Procedure During Initial Start-Up>

Figure 5:
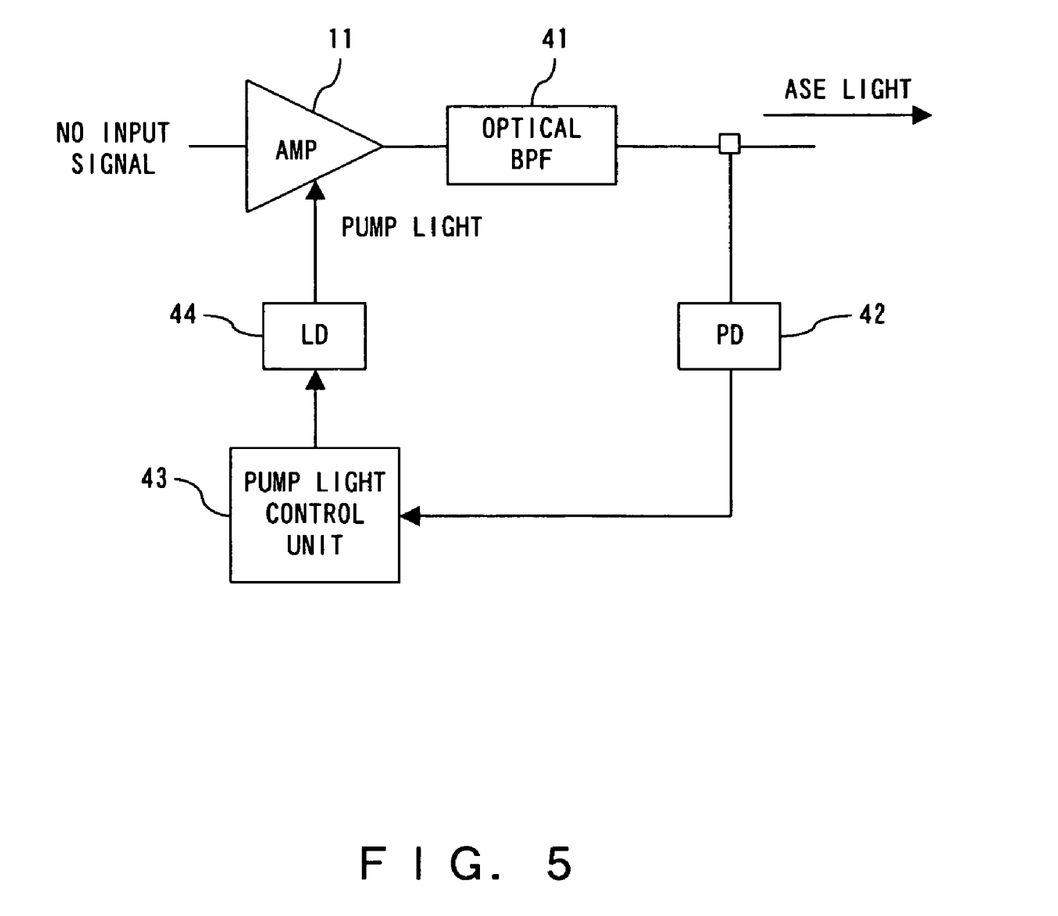
FIG. 5 is a diagram exemplifying generation of the ASE light.
Figure 6:
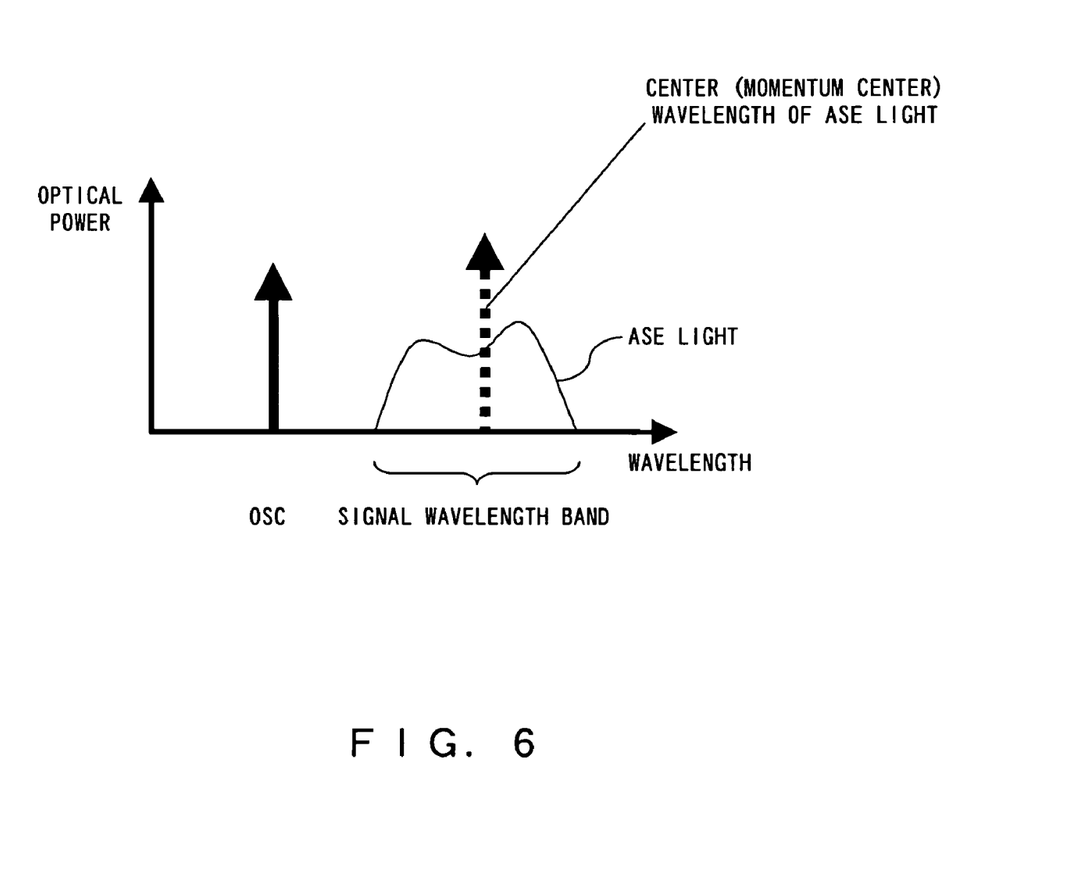
FIG. 6 is a diagram showing an allocation of ASE light and OSC light.

Procedure 1: The CPU 12 generates the ASE light in an optical amplifier 11. An explanation on generating the ASE light will be given referring to FIG. 5. The optical amplifier 11 is capable of amplifying signal light using energy of the pump light. Here, the optical amplifier 11 outputs the ASE light in proportion to the power of the pump light irrespective of presence or absence of signal light. Therefore, when the pump light is given in a state during which the signal light is not inputted, the optical amplifier 11 outputs only the ASE light. An optic band pass filter 41 extracts a wavelength component of a signal wavelength band from the output light of the optical amplifier 11, which enables acquiring the ASE light in the signal wavelength band as shown in FIG. 6. A photo detector (PD) 42 detects an optical power of the ASE light. An pump light control unit 43 drives a light source (LD) 44 so that the power of the ASE light may be maintained at a desired level. The light source 44 generates the pump light in accordance with a control signal from the pump light control unit 43. With the configuration as described above, the ASE light possessing the configured power within the signal wavelength band is generated. Note that an example of a method of generating the ASE light is disclosed in Japanese Patent Application Laid-Open No. 6-97554, for example Procedure 2: A photo detector PD1 in the transmitting station 10 detects transmitting power $P1_{ref}$ of the ASE light, and a photo detector PD2 in the receiving station 20 detects received power $P2_{ref}$ of the ASE light. The receiving station 20 is notified of the transmitting power $P1_{ref}$ detected in the transmitting station 10 using an OSC signal. The receiving station 20 then calculates an ASE reference span loss based on the transmitting power $P1_{ref}$ and the received power $P2_{ref}$. The ASE reference span loss is calculated according to the following equation:

$$\text{ASE reference span loss} = P1_{ref} - P2_{ref}$$

Note that the ASE light generated as described above has the given optical power over an entire wavelength range of the signal wavelength band. Therefore, monitoring transmitting power of the ASE light is equivalent to monitoring transmitting power of an optical signal having a substantially central wavelength in the signal wavelength band. For example, in the case where the C-band (1530 to 1560 nm) is used in the WDM transmission, monitoring the transmitting power of the ASE light as described above is equivalent to monitoring the transmitting power of the signal light having a wavelength of approximately 1550 nm.

The ASE light output from the transmitting station 10 is transmitted to the receiving station 20 via the optical fiber 30. Since the optical fiber 30 has wavelength characteristics as shown in FIG. 1, the attenuation of a wavelength component in a short wavelength range of the signal wavelength band is large and the attenuation of the wavelength component in a long wavelength range in the signal wavelength band is small. Therefore, monitoring the received power of the ASE light in the receiving station 20 is equivalent to monitoring the received power of the optical signal having the substantially central wavelength of the signal wavelength band. For example, when the C-band (1530 to 1560 nm) is used in a WDM transmission, monitoring the received power of the ASE light as described above is equivalent to monitoring the received power of the signal light having a wavelength of approximately 1550 nm.

Procedure 3: A photo detector PD3 in the transmitting station 10 detects the transmitting power $P3_{ref}$ of the OSC light, and a photo detector PD4 in the receiving station 20 detects the received power $P4_{ref}$ of the OSC light. The receiving station 20 is notified of the transmitting power $P3_{ref}$ detected in the transmitting station 10 using the OSC signal. Here, the OSC light is allocated out of the signal wavelength band as shown in FIG. 6. In the case where the C-band (1530 to 1560 nm) is used in the WDM transmission, the wavelength of the OSC light is, for example, 1510 nm. In principle, the OSC light is always being transmitted from the transmitting station 10 to the receiving station 20, irrespective of the presence or absence of the signal light. The receiving station 20 calculates an OSC reference span loss based on the transmitting power $P3_{ref}$ and the received power $P4_{ref}$. The OSC reference span loss is calculated according to the following equation:

$$\text{OSC reference span loss} = P3_{ref} - P4_{ref}$$

<Procedure During Normal Operation>

Procedure 4: Procedure 4 operates similarly to Procedure 3 albeit with several minor differences. The photo detector PD3 in the transmitting station 10 detects the transmitting power $P3_{det}$ of the OSC light and notifies the receiving station 20 of the detected value. Additionally, the photo detector PD4 in the receiving station 20 detects the received power $P4_{det}$ of the OSC light. Then the receiving station 20 calculates an OSC span loss based on the transmitting power $P3_{det}$ and the received power $P4_{det}$. The OSC span loss is calculated according to the following equation:

$$\text{OSC span loss} = P3_{det} - P4_{det}$$

Procedure 5: The amount of change in span loss is determined by calculating the difference between the OSC reference span loss determined during initial start-up and the OSC span loss that has been newly determined. The actual span loss at specific (or at the current) moment is determined by adding the amount of change to the ASE reference span loss that was determined during initial start-up. The actual span loss at the point is expressed as the following equation:

$$\begin{aligned}
\text{Actual span loss} &= \text{ASE reference span loss} + \\
&\quad \text{Amount of change in span loss} \\
&= \text{ASE reference span loss} + \\
&\quad (\text{OSC span loss} - \text{OSC reference span loss}) \\
&= P1_{ref} - P2_{ref} + ((P3_{det} - P4_{det}) - \\
&\quad (P3_{ref} - P4_{ref}))
\end{aligned}$$

As described above, according to a measurement method of the present embodiment, a reference span loss is prepared using the ASE light in the signal wavelength band. Accordingly, error becomes smaller with respect to a span loss value determined in the case in which design is made with the central wavelength of the signal wavelength band.

In addition, either the transmitting station 10 or the receiving station 20 notifies the other of optical power information periodically detected during operation of the optical communication system, using the OSC signal, which always enables monitoring a change in span loss.

In addition, change in the span loss during operation of the optical communication system is measured using the OSC light. As the OSC light is positioned out of the signal wavelength band and can be monitored separately from the signal light, measurement of the span loss is not affected by the number of channels that transmit the data nor the wavelength allocation of the channels. In other words, even if the number of data transmission channels is zero, it is still possible to measure the span loss.

<<Measurement of a Span Loss (Modification)>>

Figure 7A:
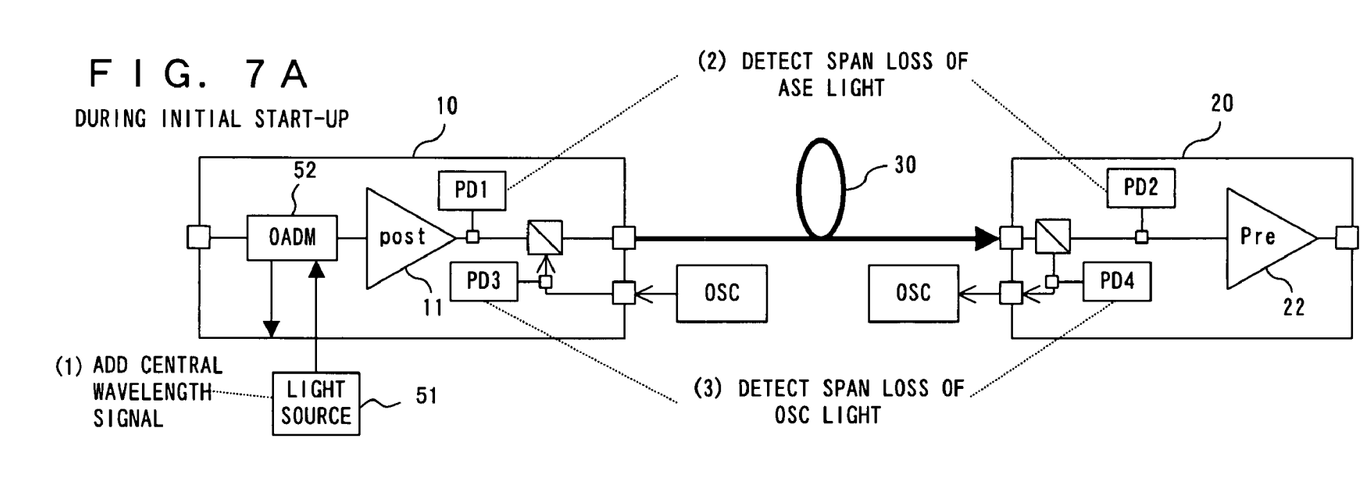
FIGS. 7A and 7B are diagrams showing another method for measuring a span loss.
Figure 7B:
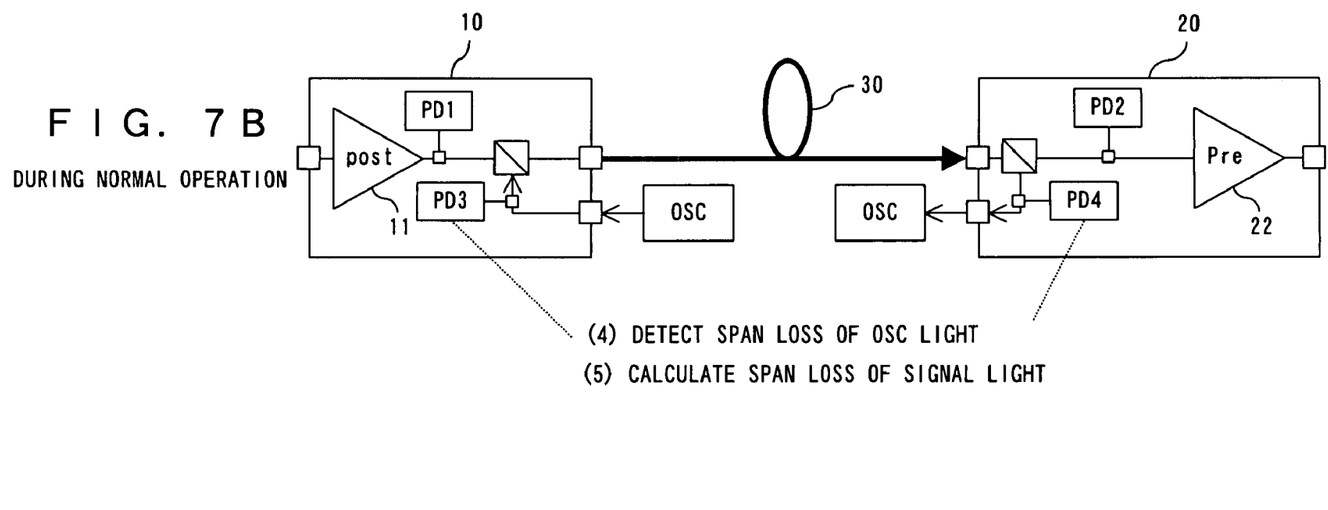

In the measurement methods as described above, the reference span loss is measured using the ASE light during initial start-up of the optical communication system. However, according to a method as shown in FIGS. 7A and 7B, the transmitting station 10 may include a light source 51 for generating an optical signal having a wavelength for which loss in the optical fiber is defined as well as an optical add-drop multiplexer 52 for adding an optical signal generated by the light source 51 to the signal transmission line. In a system where the C-band is used, the wavelength for which loss in the optical fiber is defined is, for example, 1550 nm. The reference span loss is measured using the optical signal generated by the light source 51 during start-up of the optical communication system. The procedures thereafter are the same as procedures that have been described referring to FIGS. 4A and 4B.

<<Measurement of the Receiving Power>>

Figure 8A:
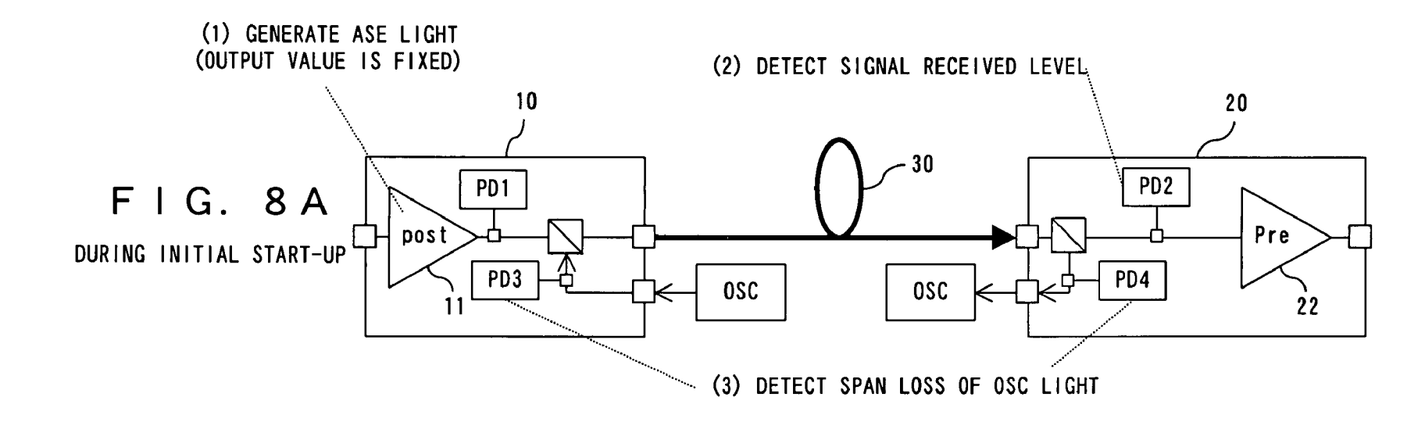
FIGS. 8A and 8B are diagrams showing a method for measuring optical receiving power in the receiving station.
Figure 8B:
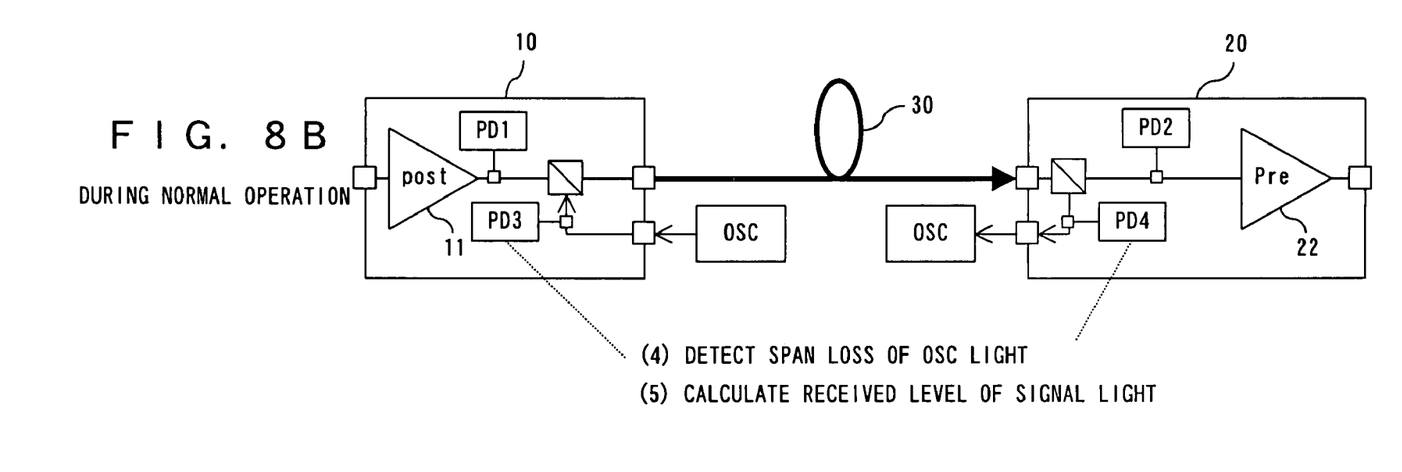

FIGS. 8A and 8B are diagrams showing a method for measuring optical received power in the receiving station 20.

Hereinafter, the method for measuring received power of the signal light per wavelength using the ASE light and the OSC light will be shown.

<Procedure During Initial Start-Up>

Procedure 1: The CPU 12 generates the ASE light in the optical amplifier 11. The transmitting power of the ASE light is adjusted to a value that has been specified in advance as the transmitting power for signal light corresponding to one channel in the optical communication system. Although the transmitting power is not particularly limited, it is, for example, approximately 0 dB.

Procedure 2: The photo detector PD2 in the receiving station 20 detects the received power $P2_{ref}$ of the ASE light. The value of the reference received power obtained by the detection is hold. Here, the reference received power is described as follows:

Reference received power=$P2_{ref}$

Procedure 3: The photo detector PD3 in the transmitting station 10 detects the transmitting power $P3_{ref}$ of the OSC light, and the photo detector PD4 in the receiving station 20 detects the received power $P4_{ref}$ of the OSC light. The receiving station 20 is notified of the transmitting power $P3_{ref}$ detected in the transmitting station 10 using the OSC signal. Then, the receiving station 20 calculates the OSC reference span loss based on the transmitting power $P3_{ref}$ and the received power $P4_{ref}$. The OSC reference span loss is calculated by the following equation:

OSC reference span loss=$P3_{ref}-P4_{ref}$

<Procedure During Normal Operation>

Procedure 4: Procedure 4 operates similarly to Procedure 3 albeit with several minor differences. That is, the photo detector PD3 in the transmitting station 10 detects the transmitting power $P3_{det}$ of the OSC light, and notifies the receiving station 20 of the detected value. In addition, the photo detector PD4 in the receiving station 20 detects the received power $P4_{det}$ of the OSC light. Then, the receiving station 20 calculates the OSC span loss based on the transmitting power $P3_{det}$ and the received power $P4_{det}$. The OSC span loss is calculated by the following equation:

OSC span loss=$P3_{det}-P4_{det}$

Procedure 5: An amount of change in span loss is calculated by calculating the difference between the OSC reference span loss detected during initial start-up and the OSC span loss that has been newly detected. Then, the actual received power in the receiving station 20 (at the current moment) is calculated by subtracting the amount of change from the reference received power which was detected during initial start-up. The actual received power at the current moment is expressed by the following equation:

Actual received power=Reference received power−Amount of change in span loss=Reference received power−(OSC span loss−OSC reference span loss)=$P2_{ref}-\{(P3_{det}-P4_{det})-(P3_{ref}-P4_{ref})\}$ <<Measurement of Received Power (in the Case where AGC is Performed in the Transmitting Station)>>

Figure 9A:
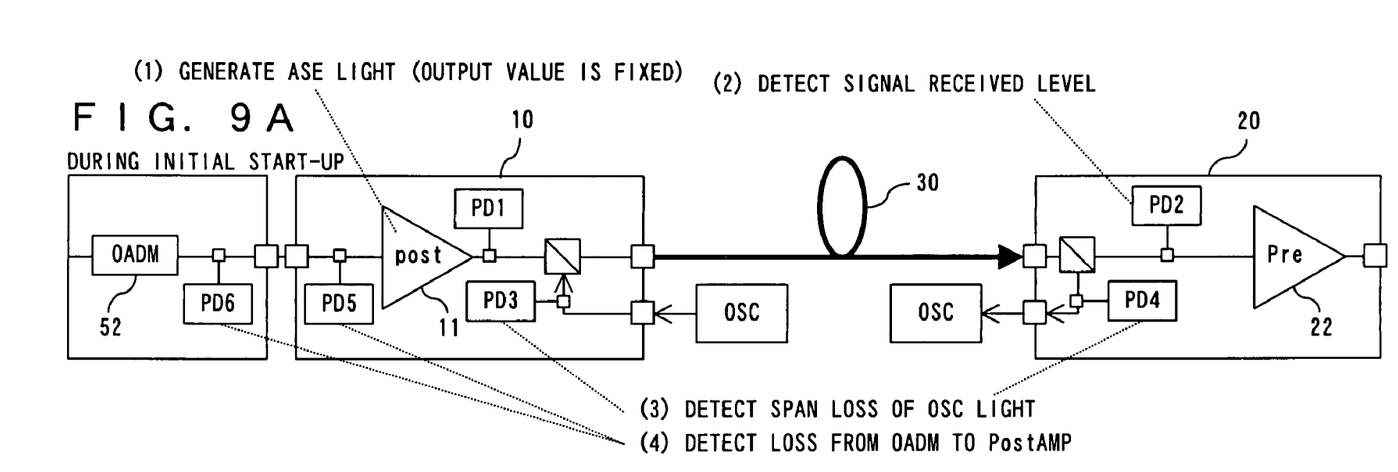
FIGS. 9A and 9B are diagrams showing a method for measuring receiving power in the receiving station in the case where an optical amplifier in the transmitting station is operated under an automatic gain control.
Figure 9B:
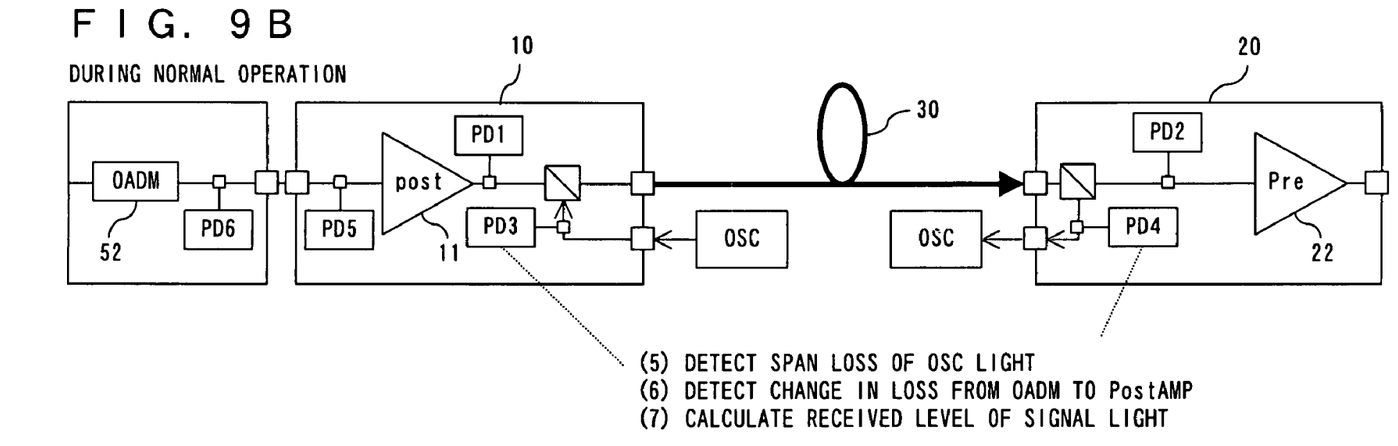

FIGS. 9A and 9B are diagrams showing a method for measuring the received power in the receiving station 20 in a case where the optical amplifier 11 in the transmitting station 10 is operated under an automatic gain control. In this configuration, when the optical loss between the optical amplifier 11 and a device provided in a previous stage of the optical amplifier (here, the optical add/drop multiplexer 52) changes, the transmitting power of the transmitting station 10 will also change. Accordingly, it is necessary to monitor the change in optical loss between the optical add/drop multiplexer 52 and the optical amplifier 11. In addition, in order to measure the optical loss, the transmitting station 10 comprises a photo detector PD5 for detecting the optical input power of the optical amplifier 11 and a photo detector PD6 for detecting an optical output power of the optical add/drop multiplexer 52.

<Procedure During Initial Start-Up>

Procedures 1 to 3: Procedures are the same as Procedures 1 to 3 that were described referring to FIG. 8A. That is, the reference received power and the OSC reference span loss are measured as follows:

Reference received power=$P2_{ref}$

OSC reference span loss=$P3_{ref}-P4_{ref}$

Procedure 4: Photo detectors PD5 and PD6 are used to detect optical powers $P5_{ref}$ and $P6_{ref}$, respectively. Here, it is assumed that the optical add/drop multiplexer 52 outputs an optical signal. Then, a reference inner loss is calculated based on the detection result. The reference inner loss is determined by the following equation:

Reference inner loss=$P6_{ref}-P5_{ref}$

<Procedure During Normal Operation>

Procedure 5: This Procedure is the same as that of Procedure 4 that was described referring to FIG. 8B. That is, the OSC span loss is calculated based on the transmitting power $P3_{det}$ and the received power $P4_{det}$ Procedure 6: Photo detectors PD5 and PD6 are used to detect the optical powers $P5_{det}$ and $P6_{det}$, respectively. Here, it is assumed that the optical add/drop multiplexer 52 outputs an optical signal. Then, the inner loss is calculated based on the detection result. The inner loss is determined by the following equation:

Inner loss=$P6_{det}-P5_{det}$

Procedure 7: An amount of change in a span loss is calculated by calculating a difference between the OSC reference span loss determined during initial start-up and the OSC span loss that has been newly determined. In addition, an amount of change in the inner loss is calculated by calculating the difference between the reference inner loss determined during initial start-up and the inner loss that has been newly determined. These changes are obtained as follows:

Amount of change in span loss=OSC span loss−OSC reference span loss

Amount of change in inner loss=Inner loss−Reference inner loss.

The actual received power in the receiving station 20 at the current moment is calculated by subtracting the amounts of change from the reference received power determined during initial start-up. The actual received power at the current moment is expressed by the following equation:

Actual received power = Reference received power −

Amount of change in span loss −

Amount of change in inner loss

= Reference received power −

($OSC$ span loss −

-continued

OSC reference span loss) −

(inner loss − reference inner loss)

$= P2_{ref} - \{(P3_{det} - P4_{det}) -$ $(P3_{ref} - P4_{ref})\} - \{(P6_{det} - P5_{det}) -$ $(P6_{ref} - P5_{ref})\}.$ <<Other Configuration>>

Figure 10A:
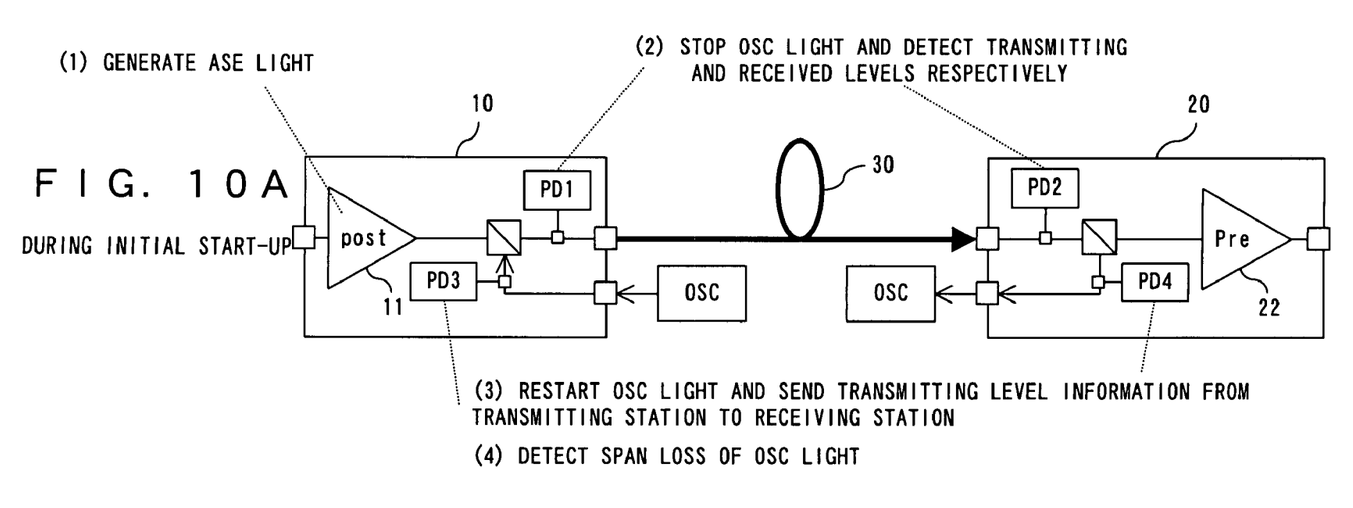
FIGS. 10A and 10B are diagrams showing a measurement method in the case of a different arrangement of photo detectors.
Figure 10B:
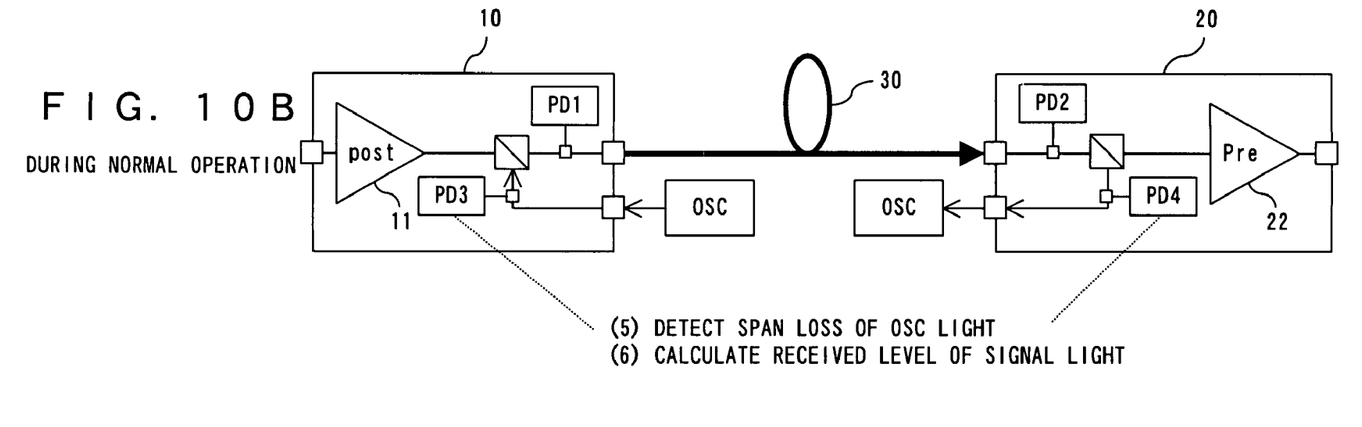

In the example described above, the photo detectors PD1 and PD2 detect the power of an optical signal that does not contain the OSC light, respectively. On the contrary, in an optical communication system as shown in FIGS. 10A and 10B, the photo detectors PD1 and PD2 detect the power of an optical signal that contains the OSC light, respectively. In the latter configuration, when the reference span loss or the reference received power is measured using the ASE light during initial start-up, the measurement is affected by the OSC light. Accordingly, in the configuration as shown in FIGS. 10A and 10B, the OSC light is temporarily stopped when the reference span loss or the reference received power is measured using the ASE light. Then, after the measured values of the reference span loss or the reference received power is held, the output of the OSC light is resumed. Procedures thereafter are the same as the procedures as described above. An introduction of the procedure enables avoiding an error in the measured value when using the ASE light and the OSC light, respectively.

What is claimed is:

1. A measurement system which measures, in an optical communication system for transmitting WDM light in a predetermined signal wavelength band from a transmitting station to a receiving station, a span loss between the transmitting station and the receiving station, comprising:

a reference light generation unit, provided in the transmitting station, for generating reference light having a wavelength component in the signal wavelength band;

a first photo detector, provided in the transmitting station, for detecting the optical power of the signal wavelength band;

a second photo detector, provided in the receiving station, for detecting the optical power of the signal wavelength band;

a third photo detector, provided in the transmitting station, for detecting the optical power of control light having a wavelength which is allocated out of the signal wavelength band;

a fourth photo detector, provided in the receiving station, for detecting the optical power of the control light;

a first calculation unit for calculating a reference span loss from results detected by said first and second photo detectors when the reference light is being generated;

a second calculation unit for calculating correction data from results detected by said third and fourth photo detectors; and a third calculation unit for calculating a span loss in the signal wavelength band by correcting the reference span loss using the correction data, wherein said second calculation unit outputs, as the correction data, a difference between a first correction value determined during initial start-up of the optical communication system and a second communication correction value determined during operation of the optical communication system.

2. The measurement system according to claim 1, wherein, said reference light generation unit is an optical amplifier for amplifying an optical signal to be transmitted to the receiving station, and the reference light is ASE light which is an output from the optical amplifier.

3. The measurement system according to claim 2, wherein the reference light is the ASE light generated by supplying pump light when no optical signal is inputted to the optical amplifier.

4. The measurement system according to claim 2, wherein said reference light generation unit comprises an optical filter transmitting a wavelength component in the signal wavelength band, and the reference light is obtained by extracting a wavelength component in the signal wavelength band from the ASE light using the optical filter.

5. The measurement system according to claim 1, wherein said reference light generation unit comprises:

a light source for generating an optical signal having a predetermined wavelength in the signal wavelength band; and an optical device for guiding the optical signal generated by the light source to a transmission line between the transmitting station and receiving station.

6. The measurement system according to claim 1, wherein, said first and second photo detectors are placed at a position where they detect the optical power of an optical signal including the control light, and the control light is stopped when said first and second photo detectors detect the optical power in order for said first calculation unit to calculate the reference span loss.

7. The measurement system according to claim 1, wherein the first correction value is a difference between the optical power detected by the third photo detector and the optical power detected by the fourth photo detector during the initial start-up of the optical communication system, and the second correction value is a difference between the optical power detected by the third photo detector and the optical power detected by the fourth photo detector during the operation of the optical communication system.

8. A measurement system which measures, in an optical communication system for transmitting WDM light in a predetermined signal wavelength band from a transmitting station to a receiving station, optical received power in the receiving station, comprising:

a reference light generation unit, provided in the transmitting station, for generating reference light having a wavelength component in the signal wavelength band;

a first photo detector, provided in the receiving station, for detecting the optical power of the signal wavelength band;

a second photo detector, provided in the transmitting station, for detecting the optical power of control light having a wavelength which is allocated out of the signal wavelength band;

a third photo detector, provided in the receiving station, for detecting the optical power of the control light; and a first calculation unit for calculating a first correction data from results detected by said second and third photo detectors, and the first correction data is a difference between a first correction value determined during initial start-up of the optical communication system and a second communication correction value determined during operation of the optical communication system, wherein said first photo detector for detecting a reference received power of the signal wavelength band while the reference light is being generated, and a value of the reference received power is hold in the receiving station, and the measurement system further comprises a second calculation unit for calculating optical received power in the signal wavelength band by correcting the reference received power using the first correction data.

9. The measurement system according to claim 8, further comprising:

a fourth photo detector for detecting optical input power of an optical amplifier, provided in the transmitting station, and for amplifying an optical signal to be transmitted to the receiving station with a constant gain;

a fifth photo detector for detecting optical output power of an add-drop multiplexer provided in a previous stage of the optical amplifier;

a third calculation unit for calculating an optical loss between an output of the add-drop multiplexer and an input of the optical amplifier from results detected by said fourth and fifth photo detectors; and a fourth calculation unit for calculating second correction data representing a difference between an optical loss calculated by said third calculation unit during initial start-up of the optical communication system and an optical loss calculated by said third calculation unit during operation of the optical communication system, wherein, said second calculation unit calculates the optical received power in the signal wavelength band by correcting the reference received power using the first and second correction data.

10. The measurement system according to claim 8, wherein the first correction value is a difference between the optical power detected by the third photo detector and the optical power detected by the fourth photo detector during the initial start-up of the optical communication system, and the second correction value is a difference between the optical power detected by the third photo detector and the optical power detected by the fourth photo detector during the operation of the optical communication system.

11. A method for measuring, in an optical communication system for transmitting WDM light in a predetermined signal wavelength band from a transmitting station to a receiving station, a span loss between the transmitting station to the receiving station, comprising:

transmitting reference light having a wavelength component in the signal wavelength band from the transmitting station to the receiving station;

detecting optical power of the reference light using a first photo detector provided in the transmitting station;

detecting optical power of the reference light using a second photo detector provided in the receiving station;

calculating a reference span loss from results detected by the first and second photo detectors;

detecting optical power of control light having a wavelength which is allocated out of the signal wavelength band using a third photo detector provided in the transmitting station;

detecting optical power of the control light using a fourth photo detector provided in the receiving station;

calculating correction data from results detected by the third and fourth photo detectors, wherein the correction data is a difference between a first correction value determined during initial start-up of the optical communication system and a second communication correction value determined during operation of the optical communication system; and calculating a span loss in the signal wavelength band by correcting the reference span loss using the correction data.

12. The method according to claim 11, wherein the first correction value is a difference between the optical power detected by the third photo detector and the optical power detected by the fourth photo detector during the initial start-up of the optical communication system, and the second correction value is a difference between the optical power detected by the third photo detector and the optical power detected by the fourth photo detector during the operation of the optical communication system.

* * * * *